(12) United States Patent
Westerdahl et al.

(10) Patent No.: US 11,181,654 B2
(45) Date of Patent: Nov. 23, 2021

(54) METHOD FOR DEGHOSTING SEISMIC DATA

(71) Applicant: Equinor Energy AS, Stavanger (NO)

(72) Inventors: Harald Westerdahl, Dal (NO); Ben King, Oslo (NO); Marit Stustad Guttormsen, Billingstad (NO); Svend Østmo, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 233 days.

(21) Appl. No.: 16/493,905

(22) PCT Filed: Mar. 19, 2018

(86) PCT No.: PCT/NO2018/050077
§ 371 (c)(1),
(2) Date: Sep. 13, 2019

(87) PCT Pub. No.: WO2018/169413
PCT Pub. Date: Sep. 20, 2018

(65) Prior Publication Data
US 2020/0088900 A1 Mar. 19, 2020

(30) Foreign Application Priority Data

Mar. 17, 2017 (GB) .................................... 1704290

(51) Int. Cl.
*G01V 1/36* (2006.01)
*G01V 1/28* (2006.01)

(52) U.S. Cl.
CPC .............. *G01V 1/362* (2013.01); *G01V 1/282* (2013.01); *G01V 1/284* (2013.01); *G01V 2210/56* (2013.01)

(58) Field of Classification Search
CPC ........ G01V 1/282; G01V 1/284; G01V 1/362; G01V 2210/56
See application file for complete search history.

(56) References Cited

U.S. PATENT DOCUMENTS 5,051,961 A 9/1991 Corrigan et al.
5,253,217 A 10/1993 Justice, Jr. et al.
(Continued)

FOREIGN PATENT DOCUMENTS

WO 03/036331 A1 5/2003

OTHER PUBLICATIONS

International Search Report, PCT/NO2018/050077, dated Jun. 14, 2018 (3 pp.).
(Continued)

*Primary Examiner* — Elias Desta
(74) *Attorney, Agent, or Firm* — Eversheds Sutherland (US) LLP

(57) ABSTRACT

A method of at least partially deghosting recorded seismic s-waves, wherein recorded seismic data is provided, wherein the recorded seismic data has been recorded at a receiver located beneath the Earth's surface, and wherein the recorded seismic data includes s-wave data. The method may include the steps of finding a model of the Earth's crust for use in deghosting the recorded seismic data using the s-wave data, wherein the model includes at least one region and wherein the model includes the Earth's surface and the location of the receiver, using the model to find a deghosting operator that, when applied to the s-wave data, at least partially deghosts the s-wave data, and applying the deghosting operator to the s-wave data to at least partially deghost the s-wave data.

22 Claims, 9 Drawing Sheets

(56) References Cited

U.S. PATENT DOCUMENTS

| | | | |
|---|---|---|---|
| 6,775,618 B1* | 8/2004 | Robertsson | G01V 1/364 |
| | | | 702/14 |
| 7,505,361 B2* | 3/2009 | Sollner | G01V 1/36 |
| | | | 367/24 |
| 2008/0275649 A1 | 11/2008 | Ozdemir et al. | |
| 2013/0163376 A1 | 6/2013 | Poole | |
| 2015/0276957 A1 | 10/2015 | Caprioli et al. | |
| 2016/0061977 A1 | 3/2016 | Turnbull | |
| 2016/0178772 A1* | 6/2016 | Carter | G01V 1/282 |
| | | | 702/17 |
| 2017/0031045 A1 | 2/2017 | Poole et al. | |

OTHER PUBLICATIONS

DeMeersman, et al, S-waves and the near surface: A time-lapse study of S-wave velocity and attenuation in the weathering layer of an Alberta heavy oil field, The Leading Edge, Jan. 2013 (7 pp.).

Krohn, C.E., et al., Shallow near-surface effects, Geophysics, vol. 81, No. 5, Sep.-Oct. 2016 (11 pp.).

Extended Search Report, EP 18767221.7, dated Dec. 22, 2020 (11 pp.).

* cited by examiner

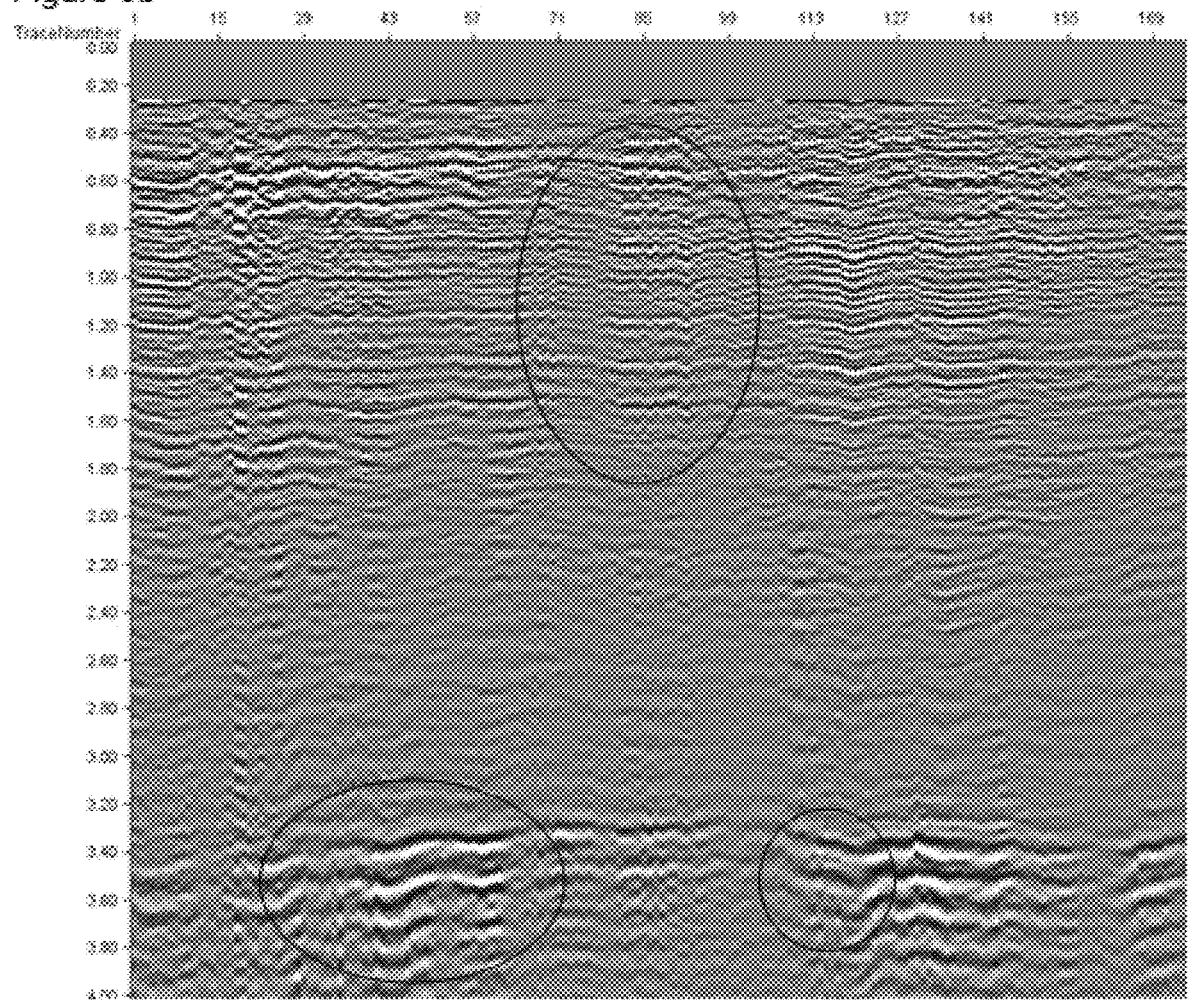

(a)

(b)

(c)

METHOD FOR DEGHOSTING SEISMIC DATA

TECHNICAL FIELD

The present invention relates to a method of deghosting seismic s-waves, a method of imaging a geological structure using deghosted seismic s-waves, a method of prospecting for hydrocarbons using deghosted seismic s-waves and a method of producing hydrocarbons using deghosted seismic s-waves.

BACKGROUND OF THE INVENTION

Ghosts are a known problem for seismic pressure waves (p-waves). Ghosts typically occur in recorded seismic p-wave data when a receiver is located beneath the sea surface. The main signal recorded by the receiver will be the generally upward-propagating p-wave through the water. However, there will also be a signal recorded from a downward-propagating p-wave. This downward-propagating p-wave is a reflection of the upward-propagating p-wave from the sea-air interface at the sea surface. Because of the distance between the receiver and the sea surface, this reflected p-wave is delayed in comparison with the upward-going p-wave. Hence, the reflected p-wave blurs or distorts the recorded data. The reflected p-wave is referred to as a ghost.

There are numerous methods known for deghosting p-wave data, such as those described in WO 2016/155771.

Another way seismic data is recorded is through the use of receivers placed beneath the Earth's surface (such as permanent reservoir monitors). The present inventors have observed that the seismic data recorded from such buried receivers is not optimal, and have identified the desire to improve such data.

SUMMARY OF THE INVENTION

In a first aspect, the invention provides a method of at least partially deghosting recorded seismic shear waves (s-waves), wherein recorded seismic data is provided, wherein said recorded seismic data has been recorded at a receiver buried in the Earth's crust beneath the Earth's surface, and wherein said recorded seismic data comprises s-wave data, the method comprising: finding a model of the Earth's crust for use in deghosting the recorded seismic data using the s-wave data, wherein the model comprises at least one region, and wherein the model comprises the Earth's surface and the location of the receiver; using said model to find a deghosting operator that, when applied to the s-wave data, at least partially deghosts the s-wave data; and applying the deghosting operator to the s-wave data to at least partially deghost the s-wave data.

The present invention improves the quality of the recorded seismic data by deghosting the s-waves.

Present deghosting techniques are focussed on deghosting p-wave data. One reason for this is that ghosts (particularly receiver-side ghosts) only typically become an issue when the receiver is located beneath a reflective surface. In most cases, this occurs when a receiver is located in the sea beneath the sea surface. Because water is a fluid, only p-waves (and no s-waves) propagate through the water. Thus, there are only p-waves present and so there are no s-waves and hence no s-wave ghosts. Thus, conventionally, s-wave ghosts have not been a problem because they have not existed.

However, in certain specific cases (such as in some permanent reservoir monitoring systems), seismic receivers may be buried beneath the Earth's surface. The inventors have observed that the seismic data recorded at these locations is not optimal: it can be blurry, or distorted, or unclear (in the time domain), and/or comprise notches (in the frequency domain). There are seismic data sets in existence that are currently not useable because they are too unclear. Further, there are permanent reservoir monitoring systems in existence that do not produce sufficiently clear data. The inventors have therefore been looking for ways to make the data gathered from these existing systems useful, so as to make sure the large cost associated with implementing a permanent reservoir monitoring system is justified. Of course, the present method could also be used for any future data sets or for future subterranean receivers.

To try to improve the quality of the recorded data, the inventors have investigated possible causes of the lack of clarity, and they have identified that one cause can be s-wave ghosts. Because the material of the Earth's crust has some elastic properties, upward-propagating s-waves can produce reflected downward-propagating s-wave ghosts from the region of the Earth's surface. However, it would not have been expected for these ghosts to be an issue for receivers buried at shallow depths (such as less than 10 m) because it would not have been expected for there to be a sufficient delay between the primary signal and the ghost signal for such shallow depths. However, the inventors have found that the s-wave velocity can be so low close to the Earth's surface that, even with receivers at shallow depths, there can be sufficient delays and near-surface response characteristics to compromise the recorded data.

From this discovery, the inventors then sought a solution to deghosting the s-wave data recorded beneath the Earth's surface.

The inventors' solution is to build a model to model the Earth's crust in the vicinity of the receiver using the s-wave data recorded by the receiver. Using this model, the inventors have found that the s-wave data can be deghosted (at least partially), so as to improve its quality for use in imaging and monitoring of a sub-surface geological structure.

By at least partially deghosting recorded seismic s-waves, it is meant that the ghost signals (i.e. the surface reflections, and possibly their near surface interactions due to layering) in recorded s-wave data are attenuated or removed. This may be seen as a sharpening of the recorded s-wave data (in the time domain), and/or as a removal of notches (in the frequency domain). "Notches" are locations in the frequency spectrum where the amplitude is below its expected value, due to interference caused by ghosts. Removing notches may be referred to as flattening the spectrum.

By the term "Earth's surface" it is meant the upper surface of the Earth's crust that contacts either air (when the Earth's surface is on dry land) or contacts water (when the Earth's surface is beneath the sea or another body of water, in which case the Earth's surface may described as the sea bed). The Earth's surface may not be the surface of a body of water, such as the sea.

The s-waves may be ps-waves. As is known, ps-waves may be s-waves that originate from a subsurface reflector when a p-wave (e.g. a downwardly-propagating p-wave originating from a seismic energy source) is incident on said reflector.

The recorded s-wave data may comprise upwardly-propagating main s-wave data, and may comprise downwardly-propagating s-wave ghost data. The s-wave ghost data may also comprise upwardly-propagating s-wave ghost data (this may occur if there is "ringing" for example, where multiple reflections are present due to near surface layers—see below for more details).

Preferably, the recorded s-wave data propagates substantially purely in the vertical direction (relative to the Earth), i.e. the main s-wave data may propagate vertically upwards, and the primary ghost reflection data may propagate vertically downwards (and also possibly vertically upwards). The vertical s-wave data may propagate vertically when close to the Earth's surface, e.g. when within 100 m, 50 m, 10 m or 5 m of the Earth's surface and/or in the region between the receiver location and the Earth's surface.

The present method is preferably for receiver-side deghosting. However, it may be for source-side deghosting. Source-side deghosting may be possible where a buried s-wave (preferably a purely s-wave) source is used. The buried s-wave source may be deghosted in a similar manner to the buried s-wave receiver.

The depth of the receiver (or each receiver where there is more than one receiver (see below)) that records the recorded seismic data may be greater than 0.1 m, greater than 0.2 m, greater than 0.5 m, greater than 1 m or greater than 1.5 m. The depth of the receiver (or each receiver where there is more than one receiver (see below)) that records the recorded seismic data may be less than 10 m, less than 5 m, less than 3 m or less than 1 m. The depth of the receiver (or each receiver where there is more than one receiver (see below)) that records the recorded seismic data may be 0.1-10 m, 0.2-5 m or 0.5-3 m.

In the present method, during finding of the model it may be assumed that all of the s-wave data is at least substantially vertically-propagating. The inventors have found that, because s-waves (e.g. ps-waves) are very slow (in comparison to p-waves), by the time the s-waves reach the Earth's surface and the buried receiver, the s-waves are travelling substantially vertically. Thus, during construction of the model, it is possible to assume that all the recorded s-wave data is vertically-propagating (either upward or downward). This can greatly simplify the model being made and correction methods applied. Indeed this realisation, assumption and simplification is one of the reasons that the inventors' method has been so successful.

In contrast, it is not possible to make this assumption when creating a model for p-wave data. Because p-waves are not slowed down as they approach the sea surface, at least not to the same degree as s-waves approaching the Earth's surface, they can arrive at the sea surface at a variety of angles, between the vertical and the horizontal.

The data generated in the model (e.g. the impulse response below) may be, preferably only, vertically-propagating.

By finding a model, it may mean or comprise developing, calculating, deriving, constructing and/or building a model. Finding a model may comprise one or more steps of selecting features of the model (which may be performed by a human (e.g. a user or operator of the present method)). Finding a model may comprise one or more steps of calculation, where the feature or features of the model are calculated.

The model may preferably comprise at least two regions. In one embodiment, the model comprises three regions. At least one parameter of the model may differ between the at least two regions. The model may comprise a boundary (or boundaries) between the at least two regions. This model is different to any model used for deghosting p-wave data from subsea receivers because the models used for deghosting p-wave data for subsea receivers only use one region (i.e. one region with the properties of water): there is no need to include multiple regions. On the other hand, due to the more complex elastic behaviour of s-waves in the region of the Earth's surface (in comparison to the simple acoustic behaviour of p-waves in sea water), the inventors have found that it can be desirable to have more than one region in the model so as to effectively deghost the data.

A region in the model may be a region (such as a depth interval in a 1D model, an area in a 2D model or a volume in a 3D model) where all the one or more parameters that define the model (e.g. the parameters that govern the propagation of s-waves in the model) are constant or vary in a particular way specific to that region (such as linearly with depth). At least one or more (or possibly all) of the parameters may differ between the regions.

A region may be a layer. The boundary between layers may be horizontal. In a 1D model, the layers and boundaries are 1D points. In a 2D model, the layers may be separated by horizontally-extending lines. In a 3D model, the layers may be separated by horizontally-extending planes.

The method may comprise selecting substantially only the s-wave data from the recorded seismic data. This may be achieved by filtering the recorded seismic data to select substantially only the s-wave data. This may be achieved by muting or attenuating the parts of the data set, typically around the early p-arrivals, containing the largest portions of p-waves. This may be performed prior to generating the model.

The recorded seismic data may comprise s-wave data and p-wave data. However, because the present method is focussed on deghosting s-wave data, the p-wave data is preferably removed from the recorded data. One reason why the present method focuses on s-wave data, is that the assumption that the s-wave data is vertically propagating is valid for s-wave data and not for p-wave data, and the model that accurately models s-wave data may not be as accurate for modelling p-wave data (i.e. it can be better to deghost p and s wave data separately). When considering a data set recorded by a buried receiver in the seabed, the structure of the s-model and the p-model for de-ghosting are totally different. Using the p-model, the technique and assumptions used for de-ghosting s-data will fail. Finding the model may comprise determining the number of regions in the model. This may be achieved by selecting the number of regions in the model (which may be performed by a user or operator of the method), and/or may be achieved by inverting the s-wave data. This may be the first of a number of steps in finding the model.

For best deghosting results, the inventors have found that it is best to have as few regions as possible, whilst keeping the model fairly accurate; requiring it to support the recorded data. With too few regions, the model may not be able to reconstruct the response characteristics of the recorded data. With too many regions, the solutions finding the parameters of each region can become ambiguous. Thus, there may be only two regions in the model. There may be only three regions in the model. There may be three or more regions in the model.

Finding the model may comprise determining the size of the regions in the model. This may be the depth of the regions. This may be achieved by inverting the s-wave data. This may be performed after the number of regions is determined. The size of the regions may also be determined by an optimisation process.

Finding the model may comprise determining the location of the receiver in the model. The location of the receiver in the model is preferably the same as the location of the actual physical receiver that records the seismic data. However, it may be different to the location of the actual physical receiver. The location may be a depth below the Earth's surface. The location of the physical receiver may be known and/or measured, or it may be found when finding the model (e.g. it may be found by inverting the s-wave data, which may be performed after the number of regions is determined, and possibly at the same time as the parameters are found).

The location of the receiver may be in the lower-most region. In this case, all of the ghost signal in the model at the receiver location will be downwardly-propagating. The location of the receiver may be in the uppermost region or in an intermediate region. In this case, because the receiver may be between two reflective boundaries, there may be multiple reflections (or "ringing") present, and so the ghost signal at the receiver may comprise both downwardly- and upwardly-propagating data.

The model may be at least partially defined by parameters. The parameters, together with the number of regions, the size of the regions and the location of the receiver may define the model. The parameters may comprise any/all of the material properties needed to describe an elastic or visco-elastic medium, or a subset such as: the s-wave reflection coefficient of the Earth's surface, the s-wave reflection coefficient at any boundary/ies between adjacent regions, the s-wave velocity, attenuation factor (or quality-factor) and density. Only one, more than one or all of the parameters may vary between the regions. The density and p-wave velocity could vary or may be constant throughout the model. The attenuation factor may be the inverse of the quality factor.

Finding the model may comprise determining the parameters in the model, e.g. in the different regions of the model. This may be achieved by inverting the s-wave data. This may be performed after the number of regions has been determined, and/or after the size of the regions has been determined or at the same time that the size of the regions is being determined.

Finding the model may comprise optimising the model parameters, the number of regions and/or the location of the receiver. This may be achieved by identifying notches in the frequency spectrum of the s-wave data (or the comparison of the s-wave data with the second s-wave data, see below). Optimisation can then be performed by matching the notches in the modeled s-wave data produced by the model (or the comparison between the modeled s-wave data and the second modeled s-wave data, see below) with the notches in the measured s-wave data (or the comparison between the measured s-wave data and the second measured s-wave data, see below). Additionally/alternatively, the matching may be carried out over the full spectrum honouring similarities in spectrum shape between modelled and measured s-wave data, including intervals also outside the notch locations. The latter will require assumptions or additional data to estimate a reference spectrum characterizing a ghost-free response. Such a reference spectrum may be the average of all spectra for the whole survey or along a specific survey line, or a part of a survey line.

The method may comprise finding the model using the s-wave data directly. This may mean that the model is found using the s-wave data without any major processing having taken place to the s-wave data. This may mean that the model is found using only the s-wave data (and not any other form of data). For instance, as mentioned below, the model may be found by a comparison of the s-wave data with other recorded seismic data. However, this need not be the case.

The model can be found by matching modeled data to the measured s-wave data. The modeled data may be modeled s-wave data. The modeled data may be an impulse response at the receiver location in the model. The modeled data may comprise a frequency spectrum. The measured s-wave data may comprise notches in its frequency spectrum (as mentioned above). Matching the modeled data to the measured s-wave data may comprise matching notches in the modeled frequency spectrum with notches in the measured s-wave data. This may comprise identifying notches in the frequency spectrum of the measured s-wave data and the modeled s-wave data. Notches may be matched based on their location in the frequency spectrum only, and/or the matching may be carried out over the full spectrum honouring similarities in spectrum shape between modelled- and measured s-wave data, including intervals also outside the notch locations. The latter will require assumptions or additional data to estimate a reference spectrum characterizing a ghost-free response. Such a reference spectrum may be the average of all spectra for the whole survey or along a specific survey line, or a part of a survey line. Finding the model may comprise optimising the size of the regions and/or parameters of the model to match the modeled data with the measured s-wave data (e.g. by ensuring notches in the frequency spectrum of the modeled s-wave data correspond to notches in the measured s-wave data). This may be considered to be an inversion calculation.

Alternatively to finding the model directly from the s-wave data, second recorded seismic data may be provided, the second recorded seismic data may comprise second s-wave data, and the method may comprise finding the model using a comparison of the s-wave data and the second s-wave data. The second s-wave data may have no or very few ghost effects present therein. For instance, the second recorded seismic data may be from a receiver at the Earth's surface, where no primary ghosts may be present. The location (e.g. the latitude and longitude) at which the second recorded data is measured may be very similar to that of the recorded data recorded by the buried receiver (e.g. within a horizontal distance of less than 200 m, less than 100 m or less than 50 m, or less than 10 m). This may mean that when the second recorded data is compared to the recorded data (in particular the frequency spectrum of the second s-waves is compared to the frequency spectrum of the s-waves), the ghosts in the s-waves become clearer. For instance, if the frequency spectrum of the s-wave data is divided by the frequency spectrum of the second s-wave data, then the notches caused by the ghosts in the s-wave data may be clearly seen.

The model can be found by matching modeled data to the comparison of the measured s-wave data with the measured second s-wave data. The modeled data may be modeled s-wave data, in particular a corresponding comparison between modelled s-wave data. For instance, when the comparison is between measured surface s-wave data and measured s-wave data at a depth below the surface, the modeled s-wave data may be a corresponding comparison between modeled s-wave data at the surface of the model and modeled s-wave data at the receiver location at a depth in the model. The modeled data may be a comparison between an impulse response at the receiver location in the model (at the depth of the receiver) and the corresponding response at the location the second data is recorded (e.g. the Earth's surface). The modeled data may comprise a frequency spectrum. The measured s-wave data may comprise notches in its frequency spectrum (as mentioned above), which are made clear by comparing the frequency spectrum of the measured s-wave data with the frequency spectrum of the second s-wave data. Matching the modeled data to the measured s-wave data may comprise matching notches in the comparison of the modeled s-wave and second s-wave data frequency spectrum with notches in the comparison of the measured s-wave and second s-wave data. This may comprise identifying notches in the comparison of the frequency spectra of the measured s-wave and second s-wave data and in the comparison of the frequency spectra of the modeled s-wave data at the depth of the buried receiver and at the Earth's surface.

Thus, in other words, instead of finding the model using modeled data directly, the spectrum of the buried receiver (the s-wave data) may be normalized to the spectrum of the surface receiver (the second s-wave data) to better visualize the notches produced by the s-ghost, and matching may be done on this relative spectrum. This may be a more robust method, less sensitive to local geology and source signature.

Notches may be matched based on their location in the comparison between the s-wave data and the second s-wave data (i.e. the "normalised" spectrum) only. However, in addition to or as an alternative to this, the matching may be carried out over the full normalised spectrum honouring similarities in spectrum shape between modelled- and measured s-wave data, including intervals also outside the notch locations. The latter will require assumptions or additional data to estimate a reference spectrum characterizing a ghost-free response. Such a reference spectrum may be the average of all spectra for the whole survey or along a specific survey line, or a part of a survey line.

Finding the model may comprise optimising the size of the regions and/or parameters of the model to match the comparison of the s-wave and second s-wave data with the comparison of the measured s-wave and second s-wave data (e.g. by ensuring notches in the comparison of frequency spectra of the modeled s-wave and second s-wave data correspond to notches in the comparison of the frequency spectra of the measured s-wave and second s-wave data). This may be considered to be an inversion calculation.

Geotechnical data may be provided. The method may comprise finding the model using said geotechnical data. Geotechnical data may comprise sample, or borehole, readings of the Earth's crust in the vicinity of the receiver and Earth's surface. For instance, the geotechnical data may give information on the materials present (e.g. sand, clay, rock, water, etc.), the elasticity, density, plasticity, shear strength, and/or how these vary with depth. These may be used to find the model by being used in the inversion calculation along with the measured s-wave data (effectively as a constrain on the inversion calculation). Additionally/alternatively, these may be used to check whether the model that results from the inversion calculation (i.e. the calculation that uses the measured s-wave data to find the parameters and/or depth of the layers) has reasonable/sensible/possible parameter and/or region-depth values.

The model that is found using the present method may be a model that is capable of being used to deghost the s-wave data. It may be referred to as a deghosting model.

The model may be a 1D model, a 2D model or a 3D model. The method may comprise choosing which of a 1D, 2D or 3D model should be used. 1D is preferable because it is much simpler, and because the inventors have found that the s-wave data is vertically travelling, using a 1D model is not overly-simplified (it still produces good deghosting results).

The model that is found may be in the vicinity of the receiver in question. The model may extend from the Earth's surface to a depth at or below the receiver. The depth of the model may be less than 10 m, less than 5 m, less than 1 m. The depth may be greater than 1 m, 5 m or 10 m.

Using said model to find a deghosting operator may comprise finding an impulse response of the model, i.e. the model response due to an upward propagating single s-wave impulse at the receiver, and finding the deghosting operator from the impulse response. The impulse response may have already been found during finding of the model from the s-wave data (e.g. when inverting the s-wave data to find the model parameters and sizes of the regions). The impulse response may be referred to as the response function. The impulse response may be the impulse response at the receiver location.

A second impulse response from a location corresponding to where the second s-wave data is measured (when the above-mentioned comparison between the s-wave data and the second s-wave data is carried out) may also be calculated. This second impulse response can be compared to the impulse response for the buried receiver location in the same way that the measured s-wave data is compared to the measured second s-wave data. The deghosting operator can be found from this comparison. This deghosting operator can then be used to deghost the comparison between the measured s-wave data and the s-wave data, and hence the deghosted s-wave data can be found. The deghosting operator may be the inverse of the impulse response. When the above-mentioned comparison between the s-wave data and the second s-wave data is carried out, the deghosting operator may be the inverse of the corresponding comparison between the impulse response at the buried receiver location and the impulse response at the second receiver location (e.g. the Earth's surface).

The deghosting operator may comprise a magnitude term and a phase term.

Applying the deghosting operator to the s-wave data may comprise convolving the s-wave data with the deghosting operator. When the above-mentioned comparison between the s-wave data and the second s-wave data is carried out, applying the deghosting operator to the s-wave data may comprise applying convolving the deghosting operator with the comparison between s-wave data and the second s-wave data. Convolving the s-wave data with the deghosting operator may comprise multiplying the s-wave data and the deghosting operator together, or adding the s-wave data and the deghosting operator together.

The output of this step may be at least partially deghosted s-wave data.

The method may further comprise using the model to find an operator to bring the s-wave data from the receiver location to the Earth's surface, and/or using the model to find an operator to bring the s-wave data from Earth's surface to the receiver location. This operator may be used to compare s-wave data at the receiver location (e.g. either modeled s-wave data from the model, measured s-wave data or deghosted measured s-wave data) with s-wave data at the Earth's surface (e.g. either modeled s-wave data from the model or measured s-wave data at the surface).

The method may comprise convolving s-wave data with such an operator to move the s-wave data from the buried receiver location to the surface, and/or convolving s-wave data with such an operator to move the s-wave data from the surface to the buried receiver location. This may be useful for example in seismic monitoring, where it is sometimes desired to compare and calculate differences between two sets of data where one is recorded by a buried sensor and one is recorded at the Earth's surface.

The model may be a pure elastic model or a visco-elastic model, preferably throughout the entirety of the model. This is different to p-wave deghosting where the model is a non-elastic model (since water is a non-elastic medium). A pure elastic model may differ from a visco-elastic model in that a pure elastic model may not include an attenuation (or quality) factor parameter, whereas the visco-elastic model may include an attenuation (or quality) factor parameter.

In the model, the s-wave velocity of the model may generally decrease toward the Earth's surface. Where there are two regions, the uppermost region may have a lower s-wave velocity than the lowermost region. Where there are three regions, the uppermost layer may have the lowest s-wave velocity and the lowermost region may have the highest s-wave velocity. Generally speaking, the closer a region is to the Earth's surface, the slower its s-wave velocity may be. In the model, the variation of the s-wave velocity over a few meters (e.g. 5 m or less) can be more than one hundred percent. Again, this differs from p-wave deghosting where the p-wave velocity of the model does not change much with depth, and does not decrease significantly towards the sea-air surface.

In the model, the quality factor of the model may generally decrease toward the Earth's surface, i.e. the s-wave energy may be attenuated more at shallower depths than it is at deeper depths in the model. Where there are two regions, the uppermost region may have a lower quality factor than the lowermost region. Where there are three regions, the uppermost layer may have the lowest quality factor and the lowermost region may have the highest quality factor. Generally speaking, the closer a region is to the Earth's surface, the lower its quality factor may be, and hence the more s-wave energy is attenuated. Again, this differs from p-wave deghosting where the p-wave quality factor does not change with depth, and does not decrease towards the sea-air surface.

The recorded seismic data and the s-wave data may comprise data from one or more sources having large offsets from the receiver, such as greater than 500 m, 1000 m, 3000 m or 7000 m. The method may comprise using data from such sources without any compensation for their large offset. This may be the case because, as mentioned above, the inventors have found that the s-wave data travels substantially only in the vertical direction in the vicinity of the Earth's surface due to the s-wave being a very slow wave. In contrast, in p-wave deghosting, p-waves from large offsets would need to be compensated for their angle of incidence because they would approach the receiver location in a non-vertical direction.

The recorded seismic data may have been recorded at a receiver buried in the sea bed, and the model may be a model of the sea bed. Thus, the seismic data may be marine seismic data. Alternatively, the receiver may be buried beneath dry land.

In a second aspect, the invention provides a method of at least partially deghosting recorded seismic s-waves, wherein recorded seismic data recorded at a plurality of receivers is provided, wherein said plurality of receivers are buried in the Earth's crust beneath the Earth's surface, and wherein said recorded seismic data comprises s-wave data, the method comprising performing any of the methods of the first aspect for the recorded seismic data for each of the receivers.

Thus, where there is a plurality of receivers, a model may be found for each receiver from the data recorded by that receiver.

In a third aspect, the invention provides a method of imaging a geological structure comprising performing any of the methods of the first and/or second aspects to produce at least partially deghosted s-wave data, and using said at least partially deghosted s-wave data to image the geological structure.

The geological structure may be a geological structure beneath the Earth's surface, particularly a region beneath the receiver(s). The geological structure may be a reservoir containing hydrocarbons.

Using the at least partially deghosted s-wave data to image the geological structure may comprise any known technique, such as inverting, migrating and/or stacking (when there is a plurality of receivers). The stack may be formed of deghosted s-wave data with both positive and negative offsets from the (or each) receiver. The stack may be formed only from data with positive or only from data with negative offsets from the (or each) receiver. The stack or image of the geological structure may have improved reflector continuity due to the deghosted s-wave data. The image may be sharper, or not as blurry or distorted, in comparison to when non-deghosted s-wave data is used. More details of the geological structure can therefore be seen.

Sometimes to make the best possible images, it may be beneficial to use deghosted s-wave data only with either positive or negative offsets when generating the image.

Because improved images can be found, the present methods add value to currently available data sets as well as future data sets, and adds value to currently available buried receivers (such as permanent reservoir monitoring systems) as well as future buried receivers.

The method of the third aspect may also comprise repeating the method to produce updated images of the geological structure at different times. These updated images may provide a series of images of the geological structure over different times. These images can be used to view or determine how the geological structure is changing over time. The evolution of the geological structure can be used when making decisions when producing hydrocarbons, such as where and how to drill new wells, or how to best operate existing wells. The repetition of the method over time may be referred to as a 4D seismic method.

The method may comprise acquiring seismic data at different times, which can be deghosted as discussed herein and then used to produce said images.

The repetition may occur every 6-12 months, for example.

The image(s) of the geological structure discussed above may be models of the reservoir. They may be 3D models.

Any of the methods of the first, second, third, fifth or sixth aspects may also comprise recording or acquiring the recorded seismic data. This may be performed using the receiver(s). This may involve recording or acquiring the second seismic data (where applicable), which may be performed using one or more receivers on the Earth's surface. Further, the methods may comprise obtaining or measuring the geotechnical data. These acquisition steps may be performed using known techniques.

Any of the methods of the first, second, third, fifth or sixth aspects may also comprise the step of locating the receiver(s) beneath the Earth's surface, i.e. burying the receiver(s).

The one or more receiver may be a hydrophone and/or a geophone. The one or more receiver may be capable of measuring vertical particle velocity data, horizontal particle velocity data and/or pressure data. Because the s-waves travel substantially vertically, and because the s-wave is transmitted via particle movements perpendicular to the direction of propagation, the s-wave is at least substantially totally measured by the horizontal particle velocity receiver. It may therefore be horizontal particle velocity data that is used for the present methods.

However, as mentioned above, there may be a need to select or filter the s-wave data from the recorded data. The horizontal particle velocity sensor may also detect p-wave energy. This p-wave energy may need to be removed. It can be removed by comparing the measured horizontal particle velocity data with the vertical particle velocity data and/or the pressure data. The p-wave data signal can be seen from the vertical particle velocity data and/or the pressure data. The p-wave data present in the horizontal particle velocity data can be identified from the vertical particle velocity data and/or the pressure data, and can hence be removed or attenuated. The strongest p-wave contributions in the data will typically be ahead of the s-wave in arrival time, since a p-wave is faster than an s-wave. It may be an initial portion of the recorded seismic data (e.g. the horizontal particle velocity data) that is removed to isolate the s-wave data.

In a fourth aspect, the invention provides a computer program product comprising computer readable instructions that, when run on a computer, is configured to perform any of the methods of the first, second and/or third aspects.

In a fifth aspect, the invention provides a method of prospecting for hydrocarbons, comprising: performing any of the methods of the first, second and/or third aspects; and using the at least partially deghosted s-wave data to prospect for hydrocarbons. This may comprise using the image of the geological structure to prospect for hydrocarbons.

In a sixth aspect, the invention provides a method of producing hydrocarbons, comprising: performing any of the methods of the first, second, third and/or fifth aspect; and producing hydrocarbons.

BRIEF DESCRIPTION OF THE DRAWINGS

Certain preferred embodiments will now be described by way of example only and with reference to the accompanying drawings, in which.

DETAILED DESCRIPTION

Figure 1A:
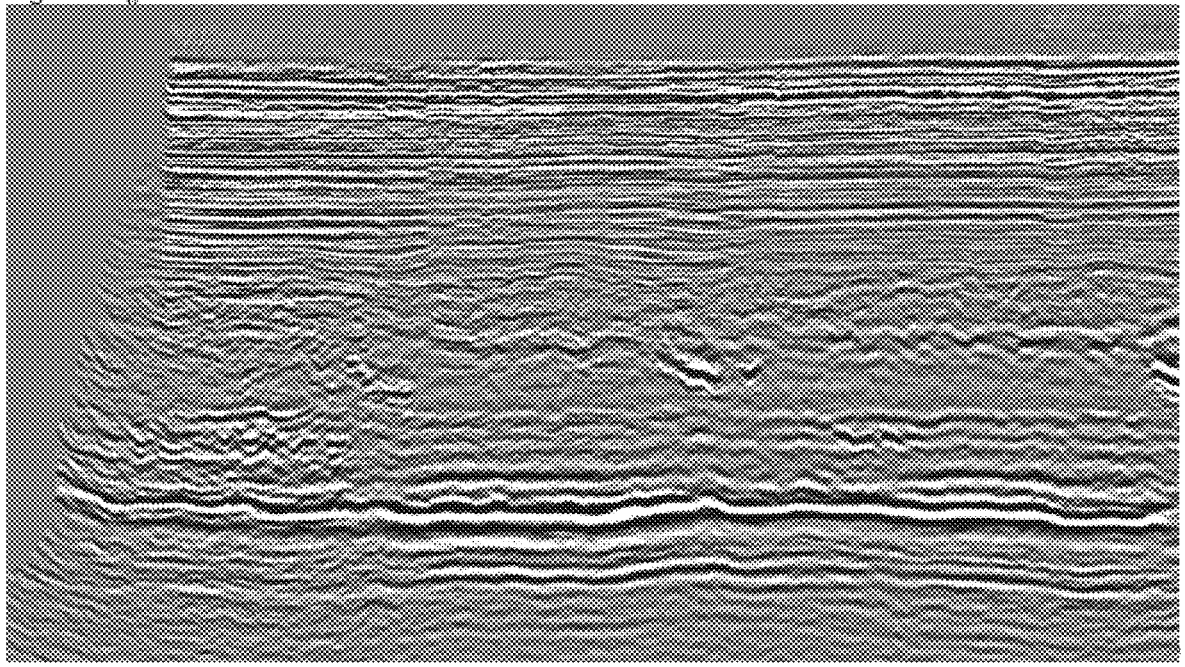
FIG. 1 shows a comparison between an image of a reservoir produced from data measured at the seabed (FIG. 1b) and data measured beneath the seabed (FIG. 1a)
Figure 1B:
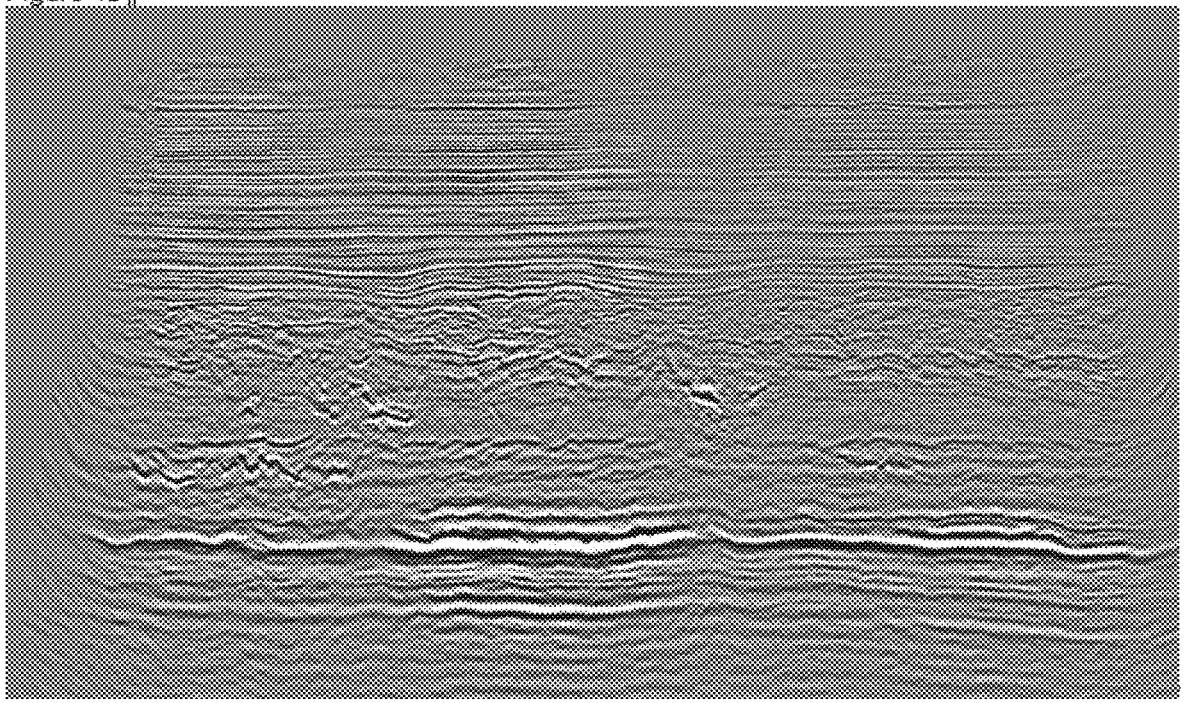

With regard to FIG. 1, FIG. 1a shows an image of a reservoir produced using ps-wave seismic data measured using receivers that are buried beneath the seabed. FIG. 1b shows an image of the same reservoir produced using ps-wave seismic data measured using receivers that are placed on the seabed.

The inventors observed that the image of the reservoir produced using buried receivers is more blurred and distorted than the image produced using receivers on the seabed. Further, the inventors observed that the subsurfaces are not as continuous for the image produced using buried receivers as it is for the image produced using receivers on the seabed.

The inventors have investigated the causes of this worse image quality, and have developed the present method to improve the quality of the imaging using ps-waves recorded at buried receivers.

Figure 2:
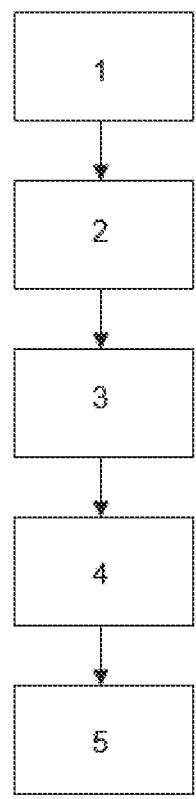
FIG. 2 shows a schematic workflow of the present method.

FIG. 2 shows a schematic workflow of the present invention.

The first step 1 is to gather seismic data from a seismic receiver that is buried beneath the Earth's surface. This data comprises horizontal particle velocity and may also comprise vertical particle velocity and/or pressure data.

The second step 2 is to filter the recorded seismic data such that the resulting filtered data is substantially only ps-wave data. One way this is achieved is shown in FIG. 3. First of all, the horizontal particle data only is considered. The inventors have found that, because ps-waves are very slow (in comparison to p-waves), the ps-waves incident on the buried receiver are substantially only vertically-propagating. This means that the ps-waves are substantially only recorded on the horizontal particle velocity receiver. Secondly, the p-wave contribution to the horizontal particle velocity data that is recorded is removed. This is done by removing all data that arrives before a certain time for a given source-receiver offset. Because p-waves are faster than ps-waves, the initial part of the data will contain p-wave contributions and no or little ps-wave contributions. The amount of data to be ignored (or removed or filtered) can be determined by comparing the horizontal particle velocity data with the vertical particle velocity data and/pressure data, which will include corresponding data from the p-wave arrivals. In FIG. 3, the data from times before the dotted line is removed from the data set.

Returning to FIG. 2, step 3 involves producing a model 10 for deghosting the recorded ps-wave data from the recorded ps-wave data. Two different examples of such a model are shown in FIGS. 5 and 6.

Figure 5:
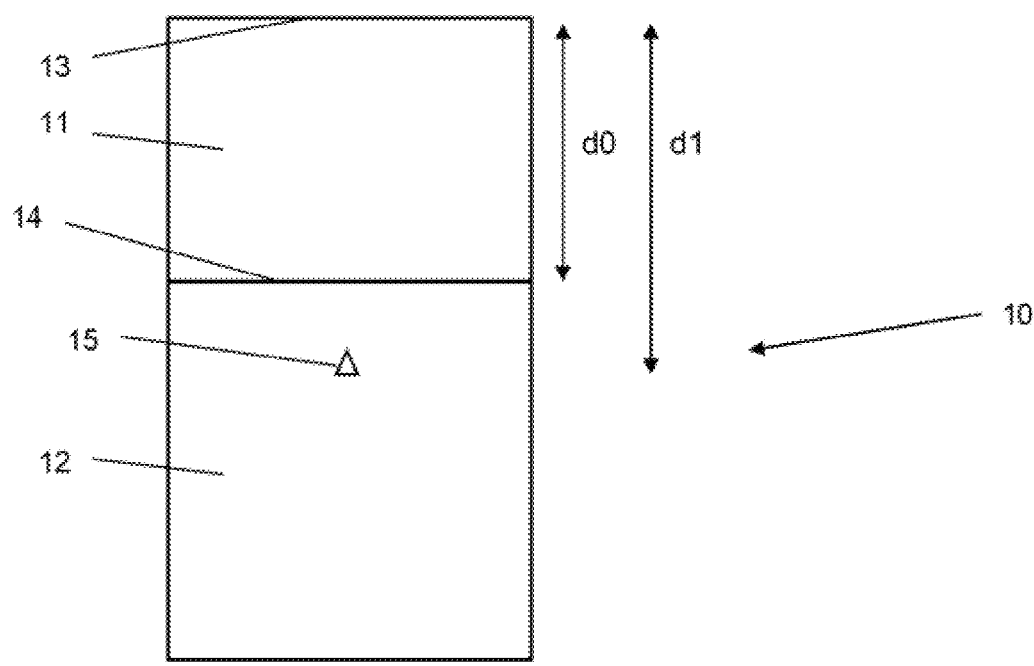
FIG. 5 shows an example of a model used in the present method.
Figure 6:
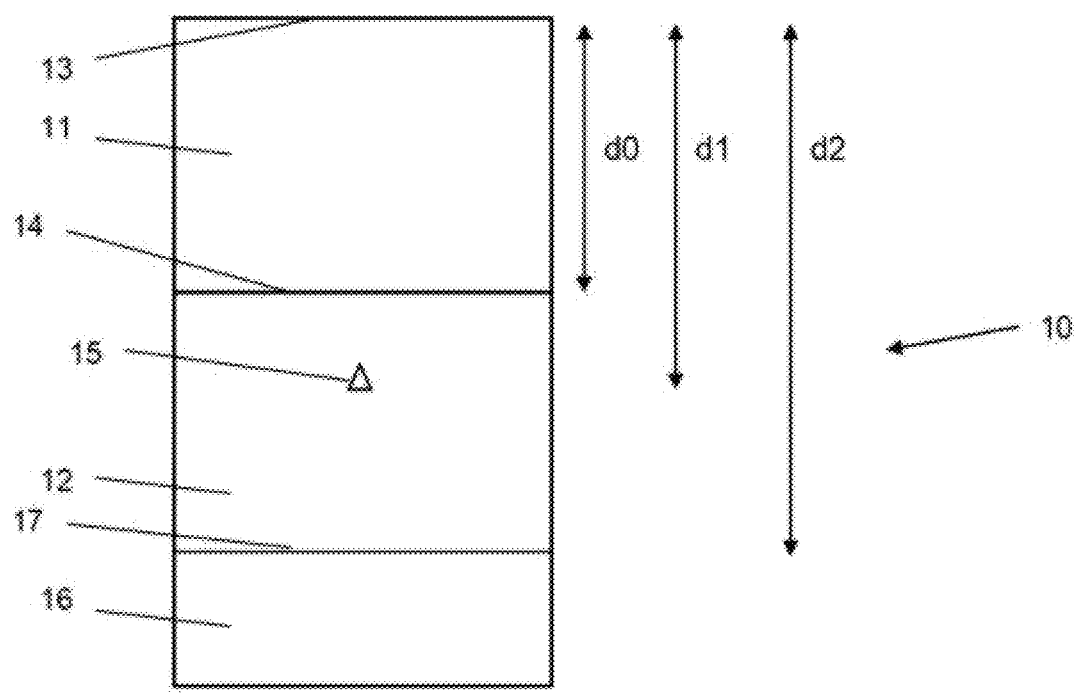
FIG. 6 shows another example of a different model used in the present method.

Regarding FIG. 5, the model 10 is a 1D model that consists of two layers 11, 12. The layers 11, 12 comprise an upper layer 11 and a lower layer 12. There is a boundary 14 between the upper layer 11 and the lower layer 12. The model 10 also comprises the Earth's surface 13 on top of the upper layer 11. The model comprises a receiver location 15. The boundary 14 is at a depth d0 and the receiver 15 is at a depth d1. In FIG. 5, d1 is shown as being greater than d0, but d1 may be less than d0. The depth of the model extends to a depth below the receiver 15 depth d1 and below the boundary 14 depth d0. The ghost signal at the receiver 15 may include ringing from multiple reflections between boundaries 13 and 14.

The upper layer 11 may have a depth d0 of greater than 0.05 m, greater than 0.2 m, or greater than 0.5 m. The upper layer 11 may have a depth d0 of less than 2 m, less than 1 m, or less than 0.5 m. The uppermost layer 11 may have a depth d0 of 0.05-3 m, 0.2-2 m or 0.5-1 m.

The upper layer 11 may have an s-wave velocity of greater than 5 m/s, greater than 20 m/s or greater than 50 m/s. The upper layer 11 may have an s-wave velocity of less than 300 m/s, less than 100 m/s or less than 50 m/s. The uppermost layer 11 may have an s-wave velocity of 5-300 m/s or 5-100 m/s.

The upper layer 11 may have a quality factor of greater than 1, greater than 2 or greater than 5. The uppermost layer 11 may have a quality factor of less than 2000, less than 1000, or less than 500. The upper layer 11 may have a quality factor of 1-2000, 2-1500 or 5-1000.

The upper layer 11 may have a density of greater than 500 kg/m$^3$, greater than 1000 kg/m$^3$, or greater than 2000 kg/m$^3$. The uppermost layer 11 may have a density of less than 10000 kg/m$^3$, less than 5000 kg/m$^3$, or less than 2000 kg/m$^3$. The uppermost layer 11 may have a density of 500-10000 kg/m$^3$, 500-5000 kg/m$^3$, or 500-2000 kg/m$^3$.

The lower layer 12 may have an s-wave velocity of greater than 20 m/s, greater than 50 m/s or greater than 100 m/s. The lower layer 12 may have an s-wave velocity of less than 600 m/s, less than 200 m/s or less than 100 m/s. The lowermost layer 12 may have an s-wave velocity of 20-600 m/s, 50-200 m/s or 70-150 m/s. The lower layer 12 may have a greater s-wave velocity than the upper layer 11.

The lower layer 12 may have a quality factor of greater than 2, greater than 5, greater than 10 or greater than 100. The lower layer 12 may have a quality factor of less than 10000, less than 5000, or less than 1000. The lower layer 12 may have a quality factor of 2-10000, 10-5000 or 50-2000. The quality factor of the lower layer 12 may be greater than the quality factor of the upper layer 11.

The lower layer 12 may have a density of greater than 500 kg/m$^3$, greater than 1000 kg/m$^3$, or greater than 2000 kg/m$^3$. The lower layer 12 may have a density of less than 10000 kg/m$^3$, less than 5000 kg/m$^3$, or less than 2000 kg/m$^3$. The lower layer 12 may have a density of 500-10000 kg/m$^3$, 500-5000 kg/m$^3$, or 500-2000 kg/m$^3$. The lower layer 12 may have the same density as the upper layer 11.

The reflection coefficient of the boundary 14 between the upper 11 and lower 12 layers may be at least partially defined by the s-wave velocity in those layers.

The reflection coefficient of the Earth's surface 13 may be 0.1-1, preferably 0.4-1, preferably 0.6-1, preferably 0.6-0.9.

The receiver 15 may have a depth d1 of greater than 0.1 m, greater than 0.2 m, greater than 0.5 m, greater than 1 m or greater than 1.5 m. The receiver 15 may have a depth d1 of less than 4 m, less than 2 m or less than 1 m. The receiver 15 may have a depth d1 of 0.1-4 m, 0.2-2 m or 0.5-1.5 m. The depth d1 of the receiver 15 may be greater than or less than the depth d0 of the upper layer 11.

Regarding FIG. 6, the model 10 is a 1D model that consists of three layers 11, 12, 16. The layers 11, 12, 16 comprise an upper layer 11, an intermediate layer 12 and a lower layer 16. There is an upper boundary 14 between the upper layer 11 and the intermediate layer 12, and there is a lower boundary 17 that is between the intermediate layer 12 and the lower layer 16. The model 10 also comprises the Earth's surface 13 on top of the upper layer 11. The model comprises a receiver location 15. The upper boundary 14 is at a depth d0, the receiver 15 is at a depth d1 and the lower boundary is at depth d2. In FIG. 6, d1 is shown as being greater than d0 but less than d2, but d1 may be less than d0 or greater than d2. The depth of the model extends to a depth below the receiver 15 depth d1 and below the boundary 17 depth d2. Because the receiver 15 may be located between two reflective boundaries 14, 17, the ghost signal at the receiver 15 may include ringing from multiple reflections between boundaries 14 and 17 in addition to multiple reflections between boundaries 13 and 14 and combinations thereof.

The upper layer 11 may have a depth d0 of greater than 0.05 m, greater than 0.2 m, or greater than 0.5 m. The upper layer 11 may have a depth d0 of less than 2 m, less than 1 m, or less than 0.5 m. The uppermost layer 11 may have a depth d0 of 0.05-3 m, 0.2-2 m or 0.5-1 m.

The upper layer 11 may have an s-wave velocity of greater than 5 m/s, greater than 20 m/s or greater than 50 m/s. The upper layer 11 may have an s-wave velocity of less than 200 m/s, less than 100 m/s or less than 50 m/s. The uppermost layer 11 may have an s-wave velocity of 5-200 m/s or 20-100 m/s.

The upper layer 11 may have a quality factor of greater than 1, greater than 2 or greater than 5. The uppermost layer 11 may have a quality factor of less than 2000, less than 1000, or less than 500. The upper layer 11 may have a quality factor of 1-2000, 2-1500 or 5-1000.

The upper layer 11 may have a density of greater than 500 kg/m$^3$, greater than 1000 kg/m$^3$, or greater than 2000 kg/m$^3$. The uppermost layer 11 may have a density of less than 10000 kg/m$^3$, less than 5000 kg/m$^3$, or less than 2000 kg/m$^3$. The uppermost layer 11 may have a density of 500-10000 kg/m$^3$, 500-5000 kg/m$^3$, or 500-2000 kg/m$^3$.

The intermediate layer 12 may have a depth d2 of greater than 0.2 m, greater than 0.4 m, or greater than 1 m. The intermediate layer 12 may have a depth d2 of less than 10 m, less than 5 m, or less than 2 m. The intermediate layer 12 may have a depth d2 of 0.2-10 m or 1-5 m.

The intermediate layer 12 may have an s-wave velocity of greater than 20 m/s, greater than 50 m/s, or greater than 100 m/s. The intermediate layer 12 may have an s-wave velocity of less than 400 m/s, less than 200 m/s or less than 100 m/s. The intermediate layer 12 may have an s-wave velocity of 20-400 m/s, 50-200 m/s or 70-150 m/s. The intermediate layer 12 may have a greater s-wave velocity than the upper layer 11.

The intermediate layer 12 may have a quality factor of greater than 2, greater than 5, greater than 10 or greater than 100. The intermediate layer 12 may have a quality factor of less than 3000, less than 2000, or less than 1000. The intermediate layer 12 may have a quality factor of 2-3000, 10-2000 or 50-1000. The quality factor of the intermediate layer 12 may be greater than the quality factor of the upper layer 11.

The intermediate layer 12 may have a density of greater than 500 kg/m, greater than 1000 kg/m$^3$, or greater than 2000 kg/m$^3$. The intermediate layer 12 may have a density of less than 10000 kg/m$^3$, less than 5000 kg/m$^3$, or less than 2000 kg/m$^3$. The intermediate layer 12 may have a density of 500-10000 kg/m$^3$, 500-5000 kg/m, or 500-2000 kg/m$^3$. The intermediate layer 12 may have the same density as the upper layer 11.

The reflection coefficient of the boundary 14 between the upper 11 and intermediate 12 layers may be at least partially defined by the s-wave velocity in those layers.

The lower layer 16 may have an s-wave velocity of greater than 40 m/s, greater than 100 m/s or greater than 200 m/s. The lower layer 16 may have an s-wave velocity of less than 1000 m/s, less than 600 m/s or less than 500 m/s. The lower layer 16 may have an s-wave velocity of 40-1000 m/s, 100-600 m/s or 200-500 m/s. The lower layer 16 may have a greater s-wave velocity than the upper layer 11 and the intermediate layer 12.

The lower layer 16 may have a quality factor of greater than 4, greater than 10, greater than 20 or greater than 100. The lower layer 16 may have a quality factor of less than 5000, less than 1000, or less than 500. The lower layer 16 may have a quality factor of 4-5000, 20-1000 or 100-500. The quality factor of the lower layer 16 may be greater than the quality factor of the upper layer 11 and the intermediate layer 12.

The lower layer 16 may have a density of greater than 500 $kg/m^3$, greater than 1000 $kg/m^3$, or greater than 2000 $kg/m^3$. The lower layer 16 may have a density of less than 10000 $kg/m^3$, less than 5000 $kg/m^3$, or less than 2000 $kg/m^3$. The lower layer 16 may have a density of 500-10000 $kg/m^3$, 500-5000 $kg/m^3$, or 500-2000 $kg/m^3$. The lower layer 16 may have the same density as the upper layer 11 and the intermediate layer 12.

The reflection coefficient of the boundary 17 between the lower 16 and intermediate 12 layers may be at least partially defined by the s-wave velocity in those layers.

The reflection coefficient of the Earth's surface 13 may be 0.1-1, preferably 0.4-1, preferably 0.6-1, preferably 0.6-0.9.

The receiver 15 may have a depth d1 of greater than 0.1 m, greater than 0.2 m, greater than 0.5 m, greater than 1 m or greater than 1.5 m. The receiver 15 may have a depth d1 of less than 4 m, less than 2 m or less than 1 m. The receiver 15 may have a depth d1 of 0.1-4 m, 0.2-2 m or 0.5-1.5 m. The depth d1 of the receiver 15 may be greater than or less than the depth d0 of the upper layer 11, and greater than or less than the depth d2 of the intermediate layer 12.

FIGS. 5 and 6 are just exemplary models, and others with differing layer numbers could also be used.

The first step in producing such a model 10 is determining the number of layers 11, 12, 16 that should be present in the model 10. This may be achieved by the user selecting the number of layers 11, 12, 16 in the model 10 and by inverting the s-wave data. Once the number of layers 11, 12, 16 has been selected, the parameters of the model 10 can be found (see more on this below) by inverting the s-wave data, and then the impulse response of the model 10 can be found. If this impulse response does not accurately model the observed ghosting in the recorded s-wave data, then a different number of layers 11, 12, 16 can be selected, and the process can start again.

The next step in finding the model 10 comprises determining the depth d0, d2 to the base of the layer(s) 11, 12 and determining the values of the parameters of the model 10. The parameters are the values that define the s-wave propagation in the model 10. The parameters comprise: s-wave reflection coefficient of the Earth's surface 13, the s-wave reflection coefficient at any (or every) boundary 14, 17 between adjacent layers 11, 12, 16 (these reflection coefficients may be different to or the same as one another, where there are multiple boundaries 14, 17), the s-wave velocity of the different layers 11, 12, 16 (which may be different to or the same as each other), quality factor of the different layers 11, 12, 16 (which may be different to or the same as each other) and/or the density of the different layers 11, 12, 16 (which may be different to or the same as each other).

Finding the depths of the base of the layers 11, 12, and the values of the parameters of the model 10 for the different layers 11, 12, 16 is achieved by inverting the s-wave data.

Step 3 can be achieved by using the s-wave data directly. However, with a view of FIGS. 3 and 4, the seismic data recorded at a buried receiver may be referred to as first seismic data and a second seismic data set may be recorded at the Earth's surface (e.g. the sea bed) near to the location of the receiver that records the first seismic data. When this is the case, step 3 can be achieved by comparing the first and second data sets as follows.

Figure 3A:
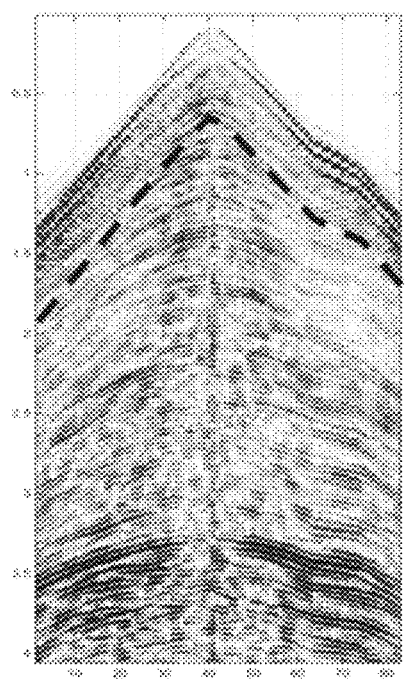
FIG. 3 shows an example of data recorded at the seabed (FIG. 3a) and a dataset recorded by a buried receiver (FIG. 3b)
Figure 3B:
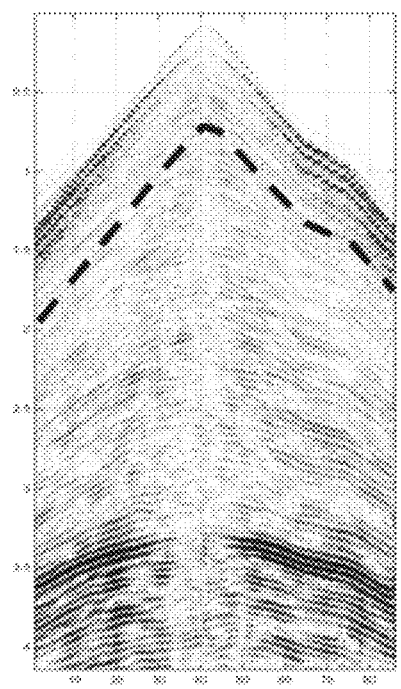

With regard to FIG. 3, FIG. 3a shows exemplary second seismic data recorded at the seabed. FIG. 3b shows exemplary first seismic data recorded beneath the sea bed at a location (in latitude and longitude) close to where the second seismic data is recorded. The depth of the receiver that recorded the first seismic data in FIG. 3b is around 0.8 m. The depth of the receiver that recorded the second seismic data in FIG. 3a is around 0.0 m.

As mentioned above, the p-wave arrivals are excluded from the first and second seismic data by removing or muting the data before a certain arrival times at given offsets (before the dotted line on each data set).

FIG. 3 shows the first and second seismic data in the time domain. Both data sets are converted into the frequency domain, and then the ratio of the amplitude of the first seismic data to the amplitude of the second seismic data is taken. This ratio (i.e. the amplitude of the first seismic data/the amplitude of the second seismic data) in the frequency domain is displayed in FIG. 4.

Figure 4:
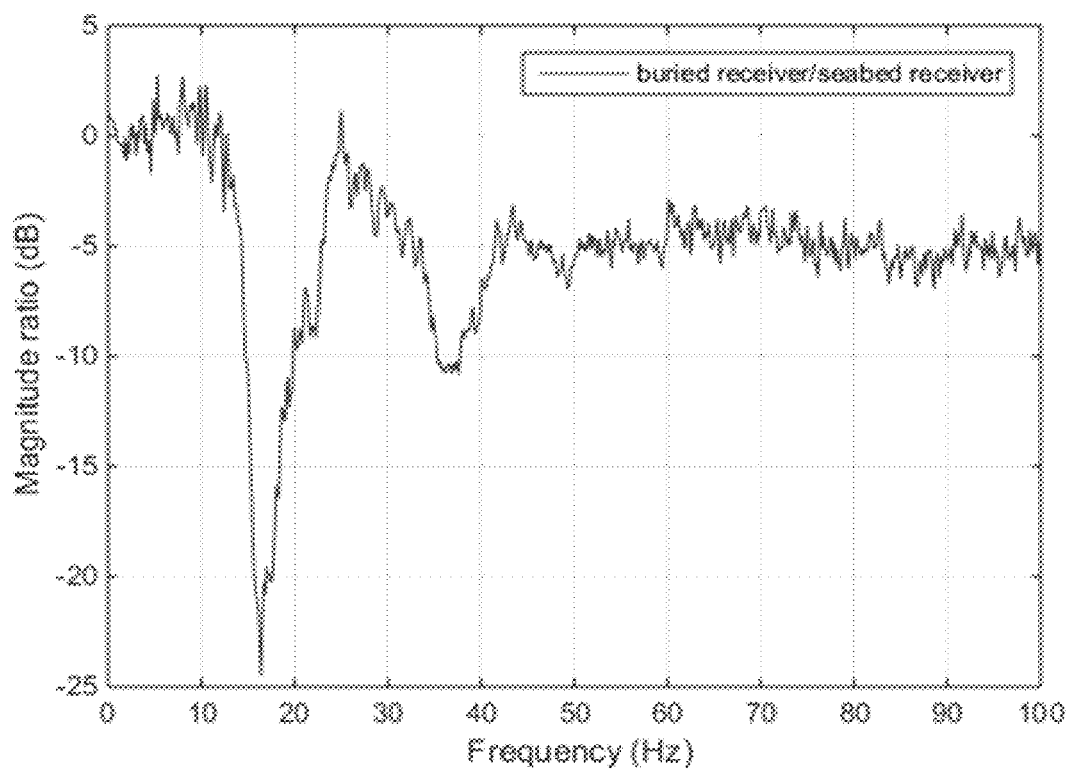
FIG. 4 shows an example of the step of comparing the spectrum of recorded seismic data from a buried receiver to the spectrum of recorded seismic data from the seabed.

As can be seen in FIG. 4, there are two large notches in the frequency spectrum of the first seismic data in comparison to the second seismic data. The inventors have found that this is because of s-wave ghosts in the first seismic data.

To find the correct number of layers 11, 12, 16, the depths of the layers 11, 12, 16 and the parameters in the model 10, the model 10 is found that gives a similar (or as near as possible) frequency spectrum to the frequency spectrum shown in FIG. 4. This is achieved by inverting the frequency spectrum of FIG. 4 to find the model 10.

Thus, the model 10 can be found.

It should be noted that there is no need to use the ratio of the first and second seismic data sets to identify notches and for the inversion calculation. Notches may be clear simply from the seismic data recorded at the buried receiver itself, in which case there is no need to use seismic data recorded at the surface to find the model 10. The location of these identified notches in the frequency spectrum, can be used directly in the inversion to determine the parameters in the model.

In order to ensure the model 10 found by inverting the s-wave data is reasonable, the model may be compared to measured geotechnical data. This geotechnical data could also be used as an additional constrain on the inversion calculation when finding the model 10.

Returning to FIG. 2, once the model has been found in step 3, the model can be used in step 4 to compute a deghosting operator. This can be achieved by producing an impulse response using the model.

Figure 7:
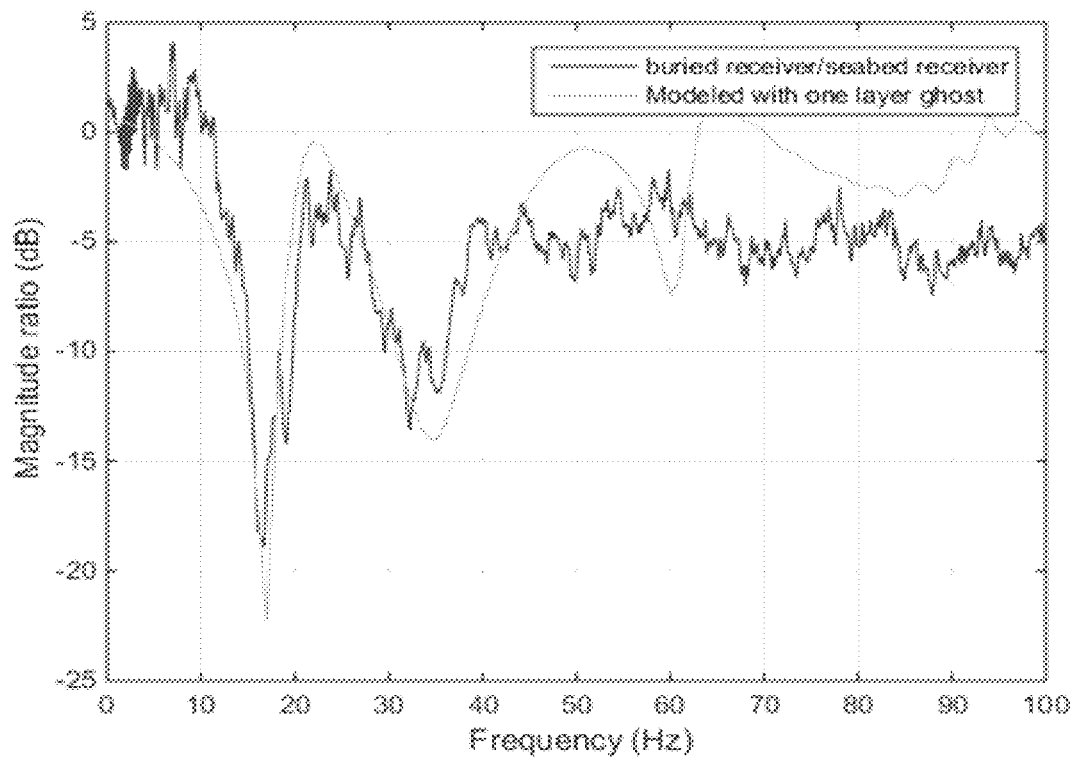
FIG. 7 shows a comparison between the magnitude part of the impulse response of a model and the recorded seismic data.

For one receiver, an example of an impulse response (the light grey line marked "Modeled with one layer ghost") compared to measured seismic s-wave data (the dark grey line marked "buried receiver/seabed receiver") can be seen in FIG. 7. This impulse response has been calculated by taking a ratio of the impulse response at the receiver location 15 to the impulse response at the Earth's surface 13 in a one-layer model 10, such as that shown in FIG. 5. This ratio can then be compared to the ratio of the measured s-wave data at the buried receiver to the measured s-wave data at a receiver on the Earth's surface. The comparison can be seen in FIG. 7. As can be seen, the modeled impulse response closely models the main two notches shown in the measured s-wave data. This is an indication that the found model 10 is a reasonable model.

From the impulse response, the inverse of the impulse response can be found. The inverse of the impulse response may be the deghosting operator.

Returning to FIG. 2, once the deghosting operator has been found in step 4, the deghosting operator can be applied to the recorded s-wave data to deghost the s-wave data in step 5. This comprises applying the deghosting operator to the s-wave data by convolving the measured s-wave data with the deghosting operator. With regard to FIG. 7, this effectively means that the inverse function of the light grey line (which is the ratio of the amplitude of the response function at the receiver location 15 to the amplitude of the response function at the Earth's surface 13) is multiplied with (or added in case where a dB scale is used) the dark grey line (which is the ratio of the amplitude of the measured s-wave data at the buried receiver to the amplitude of the measured s-wave data at the Earth's surface). Whilst the inverse of light grey line in FIG. 7 only gives the magnitude of the deghosting operator, the de-ghosting operator also includes a phase term.

Applying such a deghosting operator should remove the notches and hence flatten the frequency spectrum. Further, it should correct the phase, shifting the events to their correct positions.

The output of step 5 is deghosted s-wave data for the s-wave data that was measured at a buried receiver.

Figure 8A:
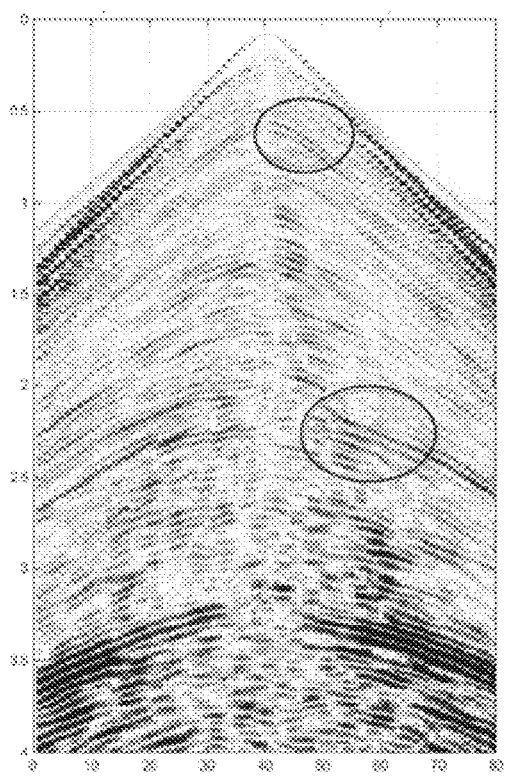
FIG. 8 shows how recorded seismic data in the time domain can be improved using the present method; s
Figure 8B:
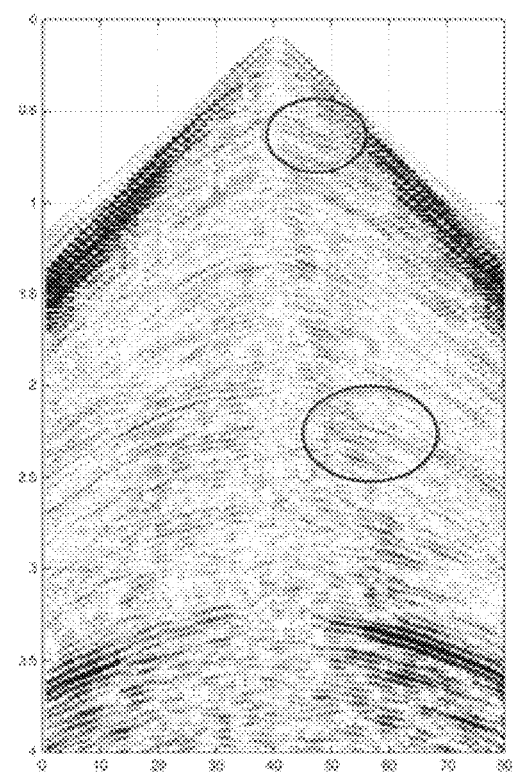

As a demonstration of the improved data, FIG. 8a shows one particular buried receiver's raw s-wave data gather in the time domain. The horizontal axis is source offset and the vertical axis is time. As can be seen, the data is quite blurred and unclear. FIG. 8b shows the same buried receiver's s-wave data gather after the present method has been used to deghost the s-wave data. In comparison to FIG. 8a, the data is much sharper, and more details can be discerned, as is highlighted in the black circles.

Steps 1 to 5 can be repeated for different buried receivers, when there is a plurality of buried receivers. A different model 10 may be constructed for each receiver since the environment in the location of each buried receiver may be different.

Once the deghosted seismic s-wave data has been produced using the above steps, it can be used to more accurately image a reservoir.

Figure 9A:
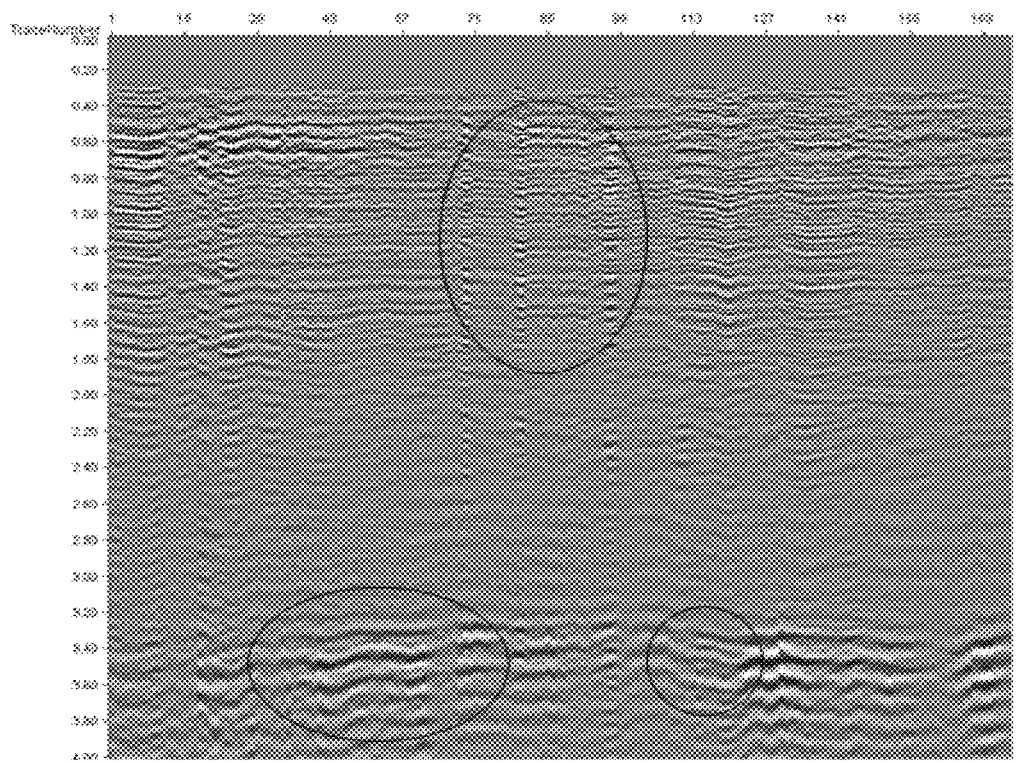
FIG. 9 shows how an image of a reservoir can be improved using the present method.

As a demonstration of the improved imaging, FIG. 9a shows an image of a reservoir produced using raw s-wave data gathered using buried receivers. The horizontal axis is receiver number (which equates to horizontal displacement) and the vertical axis is depth. As can be seen, the image is quite blurred and unclear so some of the details of reservoir cannot be seen, and there are several places where the continuity of subsurface reflectors is interrupted. Some of these issues are highlighted using the circles in FIG. 9a. FIG. 9b shows an image of the same reservoir produced using the same s-wave data as FIG. 9a, but said s-wave data having been deghosted using the present method. As can be seen, in comparison to FIG. 9a, the image is much sharper, more details can be discerned, and the continuity of the subsurface reflectors has been improved, as is highlighted in the black circles.

An example of the application of an embodiment of the invention to permanent reservoir monitoring data will now be presented.

A pure data-dependent method based on flattening of the spectra will not be sufficient to achieve deghosting, since the phase cannot be properly corrected. Instead, the method works under the assumption that the signal distortion, observed as notches, is created by the seabed itself and by strong contrasts in the shear wave velocity between a limited number of layers, typically less than 10 metres below the seabed.

In this example, the following assumptions are made:
The shear wave is travelling predominantly vertically in the very shallow so that the simple expressions for normal incidence reflection coefficients can be used.
Mode conversions are neglected.
Only S-S reflections and transmissions are considered.
A horizontally layered model with three layers is considered. This is illustrated in FIG. 10.

Figure 10:
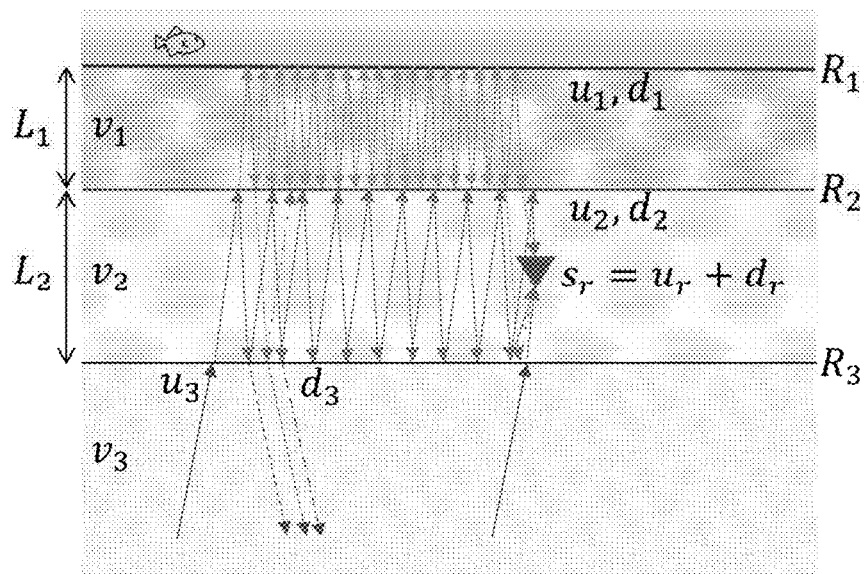
FIG. 10 illustrates a horizontally layered model with three layers.

FIG. 10 illustrates the horizontally layered model with three layers that is used in this example. Here, the thickness of the first two layers are $L_1$ and $L_2$, while the third layer is a half-space. $v_1$, $v_2$ and $v_3$ are the shear velocities. A shear wave $u_3$ is propagating from below, and the response $s_r$ is measured at the receiver (red triangle). This response is a combination of the direct wave and all intra-layer multiples, but can in principle be described as the sum of up-going and down-going waves. $u_1$ and $d_1$ are the total up-going and down-going fields at the top of layer 1, and so forth. The reflection coefficients $R_1$, $R_2$ and $R_3$ are defined by the velocity contrasts at the top of each layer.

For a plane shear wave, the normal incidence reflection and transmission coefficients for the horizontal particle velocity is:

$$R_v = \frac{I_1 - I_2}{I_1 + I_2}, \tag{1}$$

$$T_v = 1 + R_v,$$

where $I_1$ is the shear impedance of the medium of the incoming wave, and $I_2$ is the shear impedance of the medium on the other side of the interface. Neglecting density changes, we use $$R_1 \approx 1,\ R_2 = (v_2 - v_1)/(v_1 + v_2),\ R_3 = (v_3 - v_2)/(v_2 + v_3) \tag{2}$$

Note that $R_v = -R$. Hence, for up-going and down-going shear waves impinging on the top of a layer i, the reflection coefficient is $R_i$ and $-R_i$ (where i=1, 2 or 3) and the transmission coefficient is $1+R_i$ and $1-R_i$, respectively. A propagation angle different from vertical may be allowed, as well as attenuation given by a Q-value in each layer. The propagation angle in a layer is given by Snell's law and is determined by the velocity and angle in the bottom layer as input to the calculation. For plane waves propagating with an angle $\theta$ to the vertical, the propagation of down-going and up-going waves is (since $\vec{k} \cdot \vec{\Delta z} = k\Delta z \cos\theta$ and $\Delta t = \Delta z/\cos\theta$)

$$d(z + \Delta z) = d(z)e^{-i\vec{k}\cdot\vec{\Delta z}}e^{-\frac{\omega\Delta t}{2Q}} = e^{-ik\Delta z \cdot P(\theta,Q)}, \tag{3}$$

$$u(z + \Delta z) = u(z)e^{ik\Delta z \cdot P(\theta,Q)}$$

where $k = k_1 = 2\pi f/v_1$ and so forth. The propagation correction factor in each layer is $$P(\theta, Q) = \cos\theta\left(1 - \frac{i}{2Q}(1 + \tan^2\theta)\right) \tag{4}$$

Hence, the equations connecting the up-going and down-going fields at the top of the three layers are:

$$u_1 = u_2(1+R_2)e^{-ik_1L_1 \cdot P(\theta_1,Q_1)} - R_2 d_1 e^{-2ik_1L_1 \cdot P(\theta_1,Q_1)} \quad (5)$$

$$u_2 = u_3(1+R_3)e^{-ik_2L_2 \cdot P(\theta_2,Q_2)} - R_3 d_2 e^{-ik_2L_2 \cdot P(\theta_2,Q_2)} \quad (6)$$

$$d_1 = R_1 u_1 \quad (7)$$

$$d_2 = d_1(1-R_2)e^{-ik_1L_1 \cdot P(\theta_1,Q_1)} + R_2 u_2 \quad (8)$$

$$d_3 = d_2(1-R_3)e^{-ik_2L_2 \cdot P(\theta_2,Q_2)} + R_3 u_3 \quad (9)$$

The last terms in equation (5) and (6) represent the internal multiples. A solution of equation (5)-(9) in terms of the upcoming wave $u_3$ can then be written as an explicit scheme starting at the bottom and first moving upwards and then downwards in the layers:

$$u_2 = M_M M_2 (1+R_3) e^{-ik_2L_2 \cdot P(\theta_2,Q_2)} u_3 \quad (10)$$

$$u_1 = M_1 (1+R_2) e^{-ik_1L_1 \cdot P(\theta_1,Q_1)} u_2 \quad (11)$$

where the internal multiple terms are $$M_1 = \frac{1}{1 + R_1 R_2 e^{-2ik_1L_1 \cdot P(\theta_1,Q_1)}} \quad (12)$$

$$M_2 = \frac{1}{1 + R_2 R_3 e^{-2ik_1L_1 \cdot P(\theta_1,Q_1)}} \quad (13)$$

$$M_M = \frac{1}{1 + M_1 M_2 R_1 R_3 (1-R_1)(1+R_2)} \quad (14)$$
$$e^{-2ik_1L_1 \cdot P(\theta_1,Q_1)} e^{-2ik_2L_2 \cdot P(\theta_2,Q_2)}$$

The total field at the receiver depth $z_r$ is the sum of the (propagated) up-going and down-going fields in the respective layer. Finally, normalisation is performed against the up-going field at the receiver in a model with no internal multiples.

The modelling scheme is used in a deghosting strategy for the recorded horizontal components, i.e. radial component after rotation and designature. The P-events (early arrivals) are muted from the data, and one average spectrum is calculated for each receiver. An initial three-layered model is established that gives a fair match (number of notches, notches in approximately the same place) to the receiver spectra. Notches are picked both on synthetic ($s_r$) and real spectra, and the layered model is then obtained by minimizing an $L^2$ objective function for the differences in notch position. Weighting factors are used allowing to e.g. put more weight on the first notch, since it is usually less uncertain as well as the most important to correct for. The inversion problem is solved by a local search.

During the inversion, the model is re-parameterized into travel times and reflection coefficients. This allows for more robust inversion with fewer inversion parameters. First, the initial depth model is transformed to travel times and reflection coefficients: $T_r$ (two-way travel time from receiver to surface), $T_1$ and $T_2$ (two-way travel times in layers 1 and 2), and reflection coefficients $R_1$, $R_2$ and $R_3$. This transform between depth/velocities and travel times/reflection coefficients does not have to be exact (a zero-incidence assumption is used for this), as long as the forward and inverse transform is exact. Typically, in the travel time/reflection coefficient domain two to three parameters can be inverted for and still get an acceptable (sometimes perfect) match to the picked notches. This parameterization is not used in the direct calculation of the synthetic s in the objective function. The model is instead transformed back to the depth/velocity domain and the synthetic response $s_r$ is calculated with initial angle and Q-factor.

Figure 11:
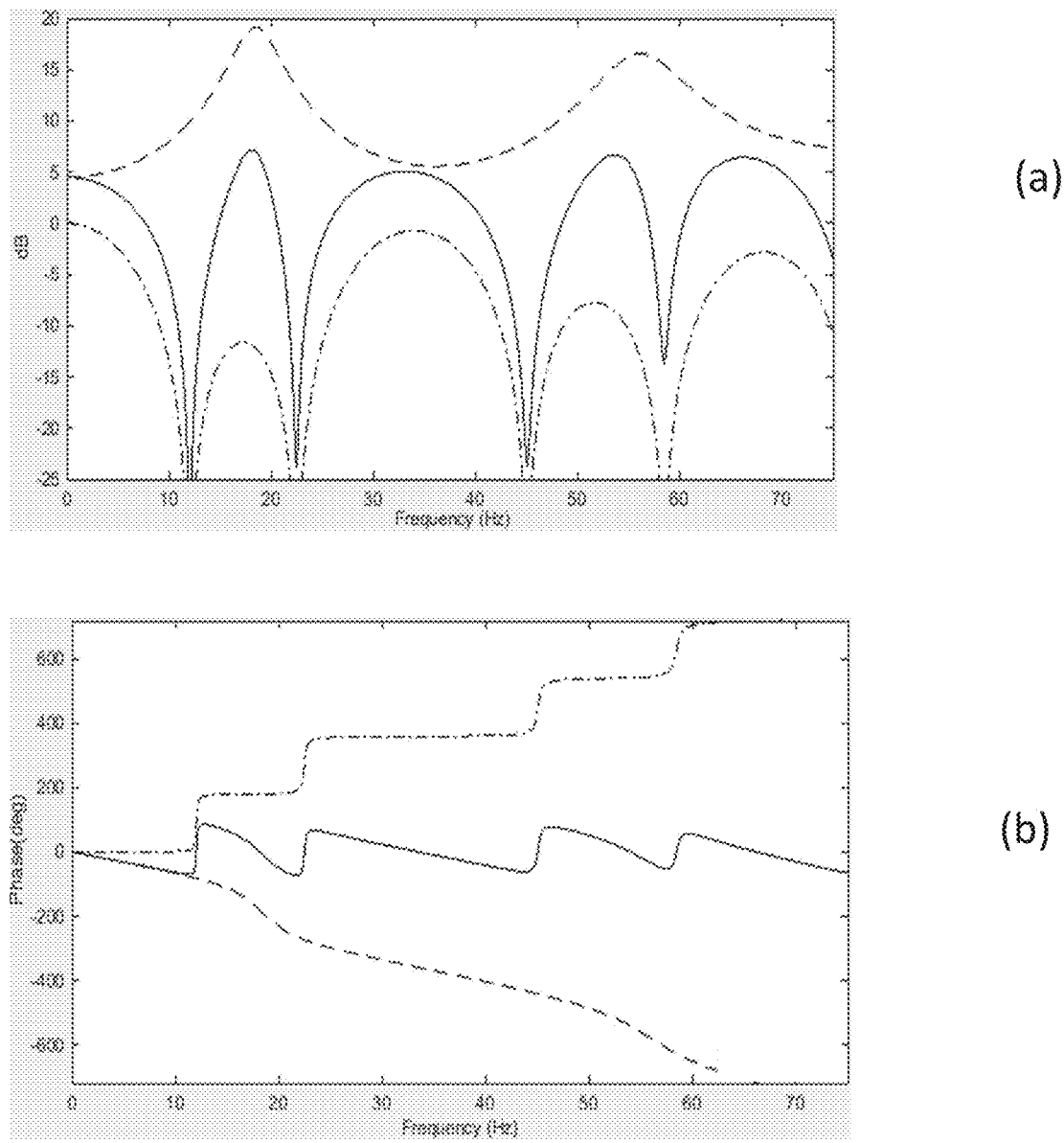
FIG. 11 shows an example of synthetic response at the receiver level and at the seabed (surface)

An example of synthetic response at the receiver level and at the seabed (surface) can be seen in FIG. 11.

FIG. 11 shows typical synthetic PS spectra for a shallow layered model, showing the receiver response $s_r$ (solid line), as well as up-going $u_1$ at the surface (dashed line), and the ratio $s_r/u_1$ (dash-dot), which is the chosen response for deghosting filter design. FIG. 11(a) shows the dB level and FIG. 11(b) shows the unwrapped phase.

Although the measured receiver burial depth is available, it is inverted for as it has been found that it is not correct in all positions, in particular for very shallow receivers. The output of the inversion process is a shallow earth model consisting of thicknesses and shear wave velocities at each receiver.

The subsequent deghosting can be performed in two different ways.

The first is to inverse filter the recorded data with the synthetic receiver response ($s_r$). This should yield the upcoming field ($u_3$) from the subsurface.

However, instead it was chosen to inverse filter the upcoming field with $s_r/u_1$. This has two advantages. First, it is slightly less model-dependent, as this ratio depends only on the properties above the receiver. Secondly, it brings the data to the surface, allowing the result to be compared with the previous non-buried OBS data recorded at the field. This choice results in the application of a 180-degree phase change at each notch. This is obviously a drastic modification of the data, but, if done correctly, it is what is desired to be achieved.

This deghosting method was applied to permanent reservoir monitoring (PRM) data from the Grane field in the North Sea.

Initially, the data was limited to two notches and a maximum frequency of 50 Hz. A weight factor of 3 for the first notch, and 1 for the second was used, and $T_r$, $T_1$ and $R_2$ were inverted for.

Using these inversion results as an initial model, a final inversion used three notches, a maximum frequency of 42 Hz and inverted for $T_r$, $T_1$, $T_2$, $R_2$ and $R_3$ simultaneously.

Q-values were not inverted for since they do not influence the notch positions, only the notch strength. Q=100 was used during the inversion, as a higher Q in this step increased accuracy, and Q=10 was used in the final filters, as this produced synthetic spectra closer to real spectra and stabilized the deghosting filter.

The inversion predicted a shallow (0-2 m) earth model with S-velocities in the uppermost layer in the order of 20-40 m/s. Available geotechnical shallow soil sampling and cone penetration tests (CPT) in the Grane area reports very loose sand and very soft clay close to the seabed that could be consistent with such low S-velocities.

Deghosting filters were designed and applied to radial gathers before demultiple. After a necessary update of statics, deghosted data was subsequently run through a full processing flow, including whitening. The result was compared to data with exactly the same processing but where deghosting had not been applied. It was also compared with images from previous non-buried ocean bottom data. It was found that deghosting clearly improved continuity and resolution in the final image, as well as better phase behaviour at major reflected events. The improved continuity and resolution in the final image is shown in FIG. 12.

Figure 12:
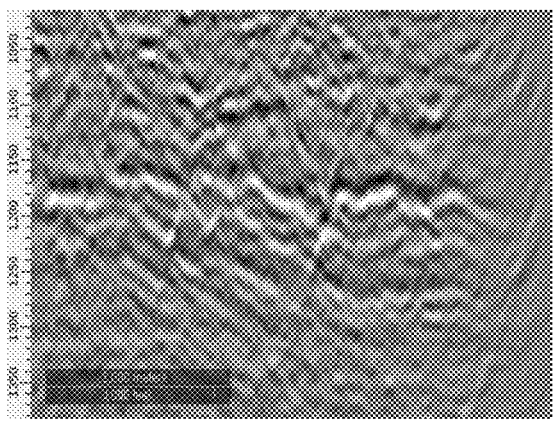
FIG. 12 shows sections of final migrated PS full stacks from the same location with different processing performed.
Figure 12:
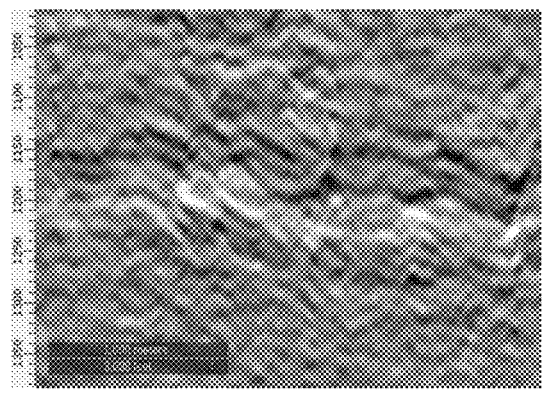
Figure 12:
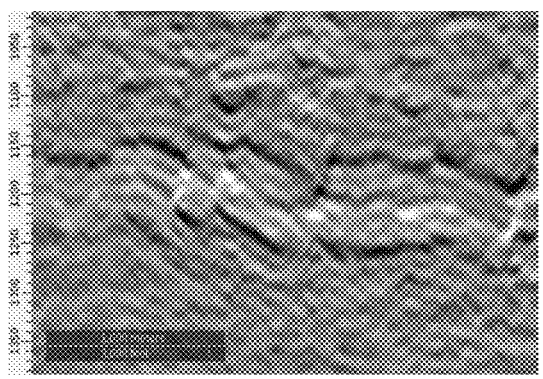

FIG. 12 shows sections of final migrated PS full stacks from the same location. The vertical axes are TWT (ms).

FIG. 12 (a) shows previous non-buried survey (different processing), FIG. 12(b) shows PRM PS without deghosting, and FIG. 12(c) shows PRM PS with deghosting. Events in FIG. 12(c) are more focused, laterally continuous, and with improved phase in FIG. 12(c).

Thus, using a method according to an embodiment of the invention, the deghosted data has more similar character to data from non-buried receivers, both in the overburden and at the reservoir level. The continuity of reflection events are improved, the holes in the spectrum are filled, the deghosted data responds better to whitening and the resolution is improved.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A method of at least partially deghosting recorded seismic s-waves, wherein recorded seismic data is provided, wherein said recorded seismic data is recorded at a receiver located beneath Earth's surface, and wherein said recorded seismic data comprises s-wave data, the method comprising:
    finding a model of the Earth's crust for use in deghosting the recorded seismic data using the s-wave data, wherein the model comprises at least one region, and wherein the model comprises the Earth's surface and the location of the receiver;
    using said model to find a deghosting operator that, when applied to the s-wave data, at least partially deghosts the s-wave data; and
    applying the deghosting operator to the s-wave data to at least partially deghost the s-wave data.

2. The method as claimed in claim 1, wherein the model comprises at least two regions, and wherein the model comprises a boundary between the two regions.

3. The method as claimed in claim 1, further comprising at least one of:
    recording the recorded seismic data; and
    selecting substantially only the s-wave data from the recorded seismic data.

4. The method as claimed in claim 1, wherein finding the model comprises at least one of:
    determining at least one of number of regions in the model, at least size of one of the number regions in the model and the location of the receiver in the model;
    finding the model using the s-wave data directly;
    assuming that all of the s-wave data is at least substantially purely vertically-propagating; and
    finding the model using geotechnical data, wherein geotechnical data is provided.

5. The method as claimed in claim 1, wherein the model comprises at least three regions.

6. The method as claimed in claim 1, wherein the model is at least partially defined by parameters comprising an s-wave reflection coefficient of the Earth's surface, the s-wave reflection coefficient at any boundaries or boundary between adjacent regions, an s-wave velocity, an attenuation factor and/or density.

7. The method as claimed in claim 6, wherein finding the model comprises determining the parameters.

8. The method as claimed in claim 1, wherein second recorded seismic data is provided, wherein the second recorded seismic data comprises second s-wave data, and wherein finding the model comprises finding the model using a comparison of the s-wave data and the second s-wave data.

9. The method as claimed in claim 1, wherein using said model to find said deghosting operator comprises finding an impulse response of the model, and finding the deghosting operator from the impulse response.

10. The method as claimed in claim 1, further comprising using the model to find an operator to bring the s-wave data from the receiver location to the Earth's surface.

11. The method as claimed in claim 1, wherein the model is an elastic model or a visco-elastic model.

12. The method as claimed in claim 1, wherein at least one of the s-wave velocity of the model and quality factor of the model generally decreases toward the Earth's surface.

13. The method as claimed in claim 1, wherein the recorded seismic data and the s-wave data comprises data from one or more sources having large offsets from the receiver.

14. The method as claimed in claim 13, wherein the large offsets from the receiver are greater than 500 m, 1000 m, 3000 m, or 7000 m.

15. The method as claimed in claim 1, wherein the recorded seismic data has been recorded at a receiver beneath in sea bed.

16. The method as claimed in claim 15, wherein the model is a model of the sea bed.

17. The method of at least partially deghosting recorded seismic s-waves, wherein recorded seismic data recorded at a plurality of receivers is provided, wherein said plurality of receivers are located beneath the Earth's surface, and wherein said recorded seismic data comprises s-wave data, the method comprising performing the method of claim 1 for each of the receivers.

18. The method of imaging a geological structure comprising performing the method of claim 1 to produce at least partially deghosted s-wave data, and using said at least partially deghosted s-wave data to image the geological structure.

19. The method as claimed in claim 18, comprising repeating the method of claim 18 to produce images of the geological structure at different times; and using said images to view or determine how the geological structure is changing over time.

20. A computer program product comprising computer readable instructions that, when run on a computer, is configured to perform the method of claim 1.

21. A method of prospecting for hydrocarbons, comprising:
    performing the method of claim 1; and
    using the at least partially deghosted s-wave data to prospect for hydrocarbons.

22. A method of producing hydrocarbons, comprising:
    performing the method of claim 1; and
    producing hydrocarbons.

* * * * *